Nov. 19, 1957     A. B. CROSS     2,813,365
SELF-PROPELLED FISHING LURE
Filed June 7, 1955
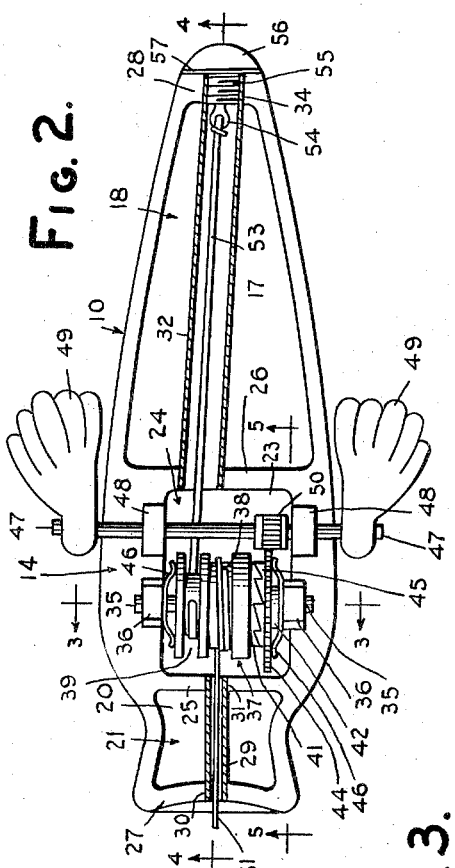
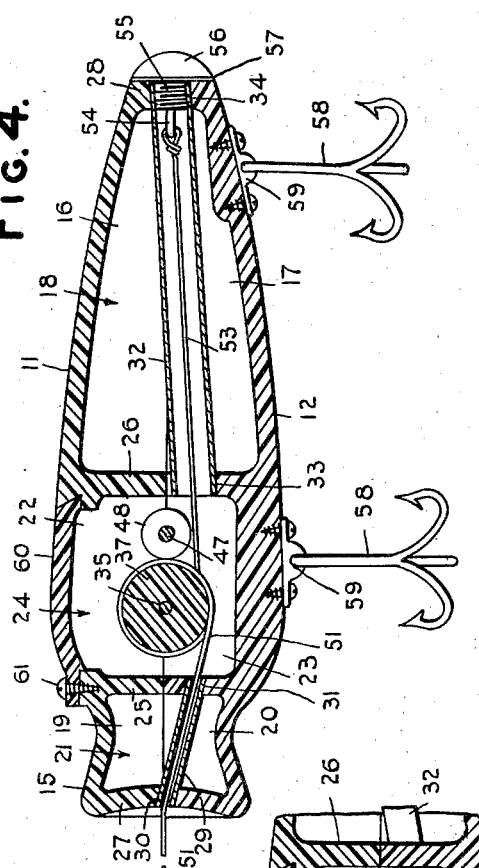
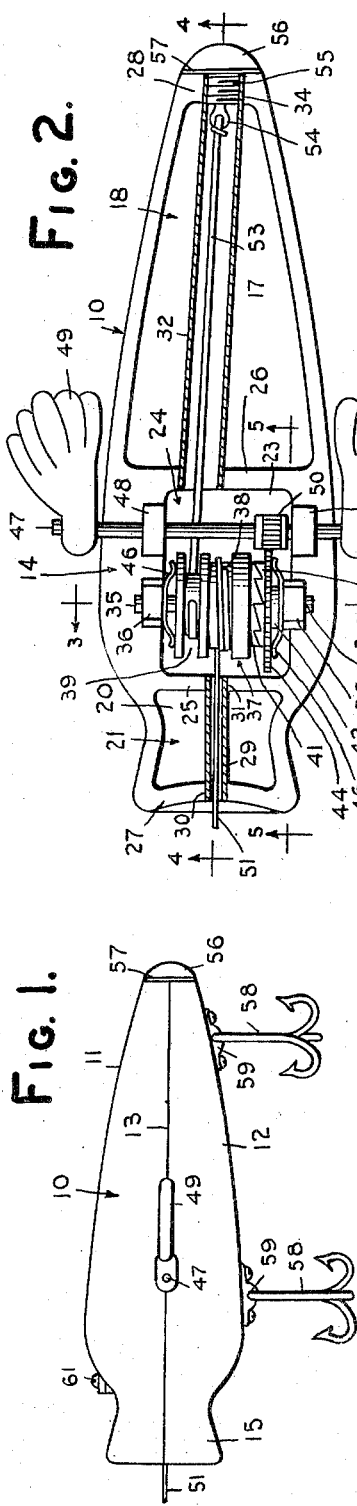
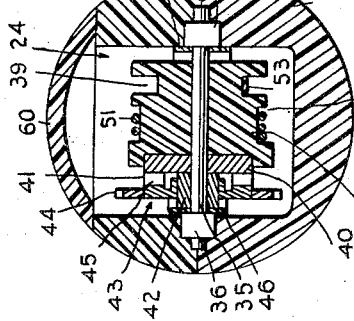
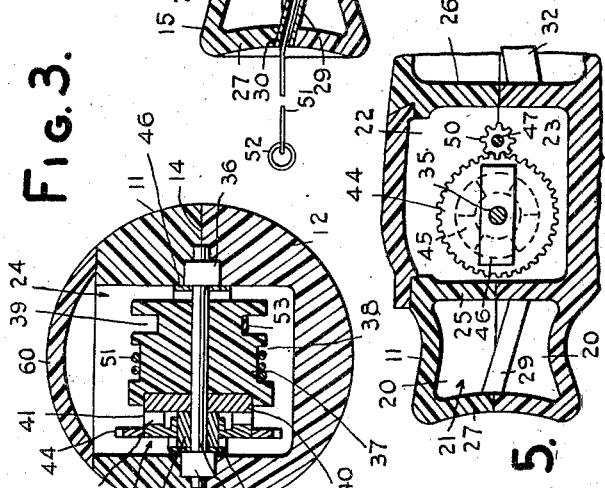
*INVENTOR.*
AUGUST B. CROSS
BY

United States Patent Office 2,813,365
Patented Nov. 19, 1957

2,813,365

SELF-PROPELLED FISHING LURE

August B. Cross, Chattanooga, Tenn., assignor to Moccasin Sporting Goods, Inc., Hamilton County, Tenn., a corporation of Tennessee Application June 7, 1955, Serial No. 513,657

4 Claims. (Cl. 43—26.2)

My invention relates to artificial bait or lures for fishing.

A primary object of the invention is to provide a lure of the self-propelled type which will imitate the action of a small bird or insect swimming on the surface of the water.

A further object is to provide a fishing lure of the above mentioned character which will continue its swimming action indefinitely merely by the fisherman repeatedly jerking or pulling the line after casting with the lure.

A further object of the invention is to provide a fishing lure of the self-propelled type which embodies rotating wings for propulsion elements operated by a gearing mechanism and utilizing an elastic or stretchable element as a source of actuating power.

Still another object is to provide in a lure of the above-mentioned character a novel and simplified body portion which may be formed of plastic material or the like and constructed to provide one or more water tight air chambers for buoyancy.

Another object of the invention is to provide a mobile lure which may be caused to swim away from the angler, actually pulling the line out further from its original point of contact with the water after casting by merely jerking the line, the angler thereby being able to cause the lure to move under overhanging ledges, logs, or the like for attracting fish.

In the accompanying drawings, forming a part of this application, and in which like numerals are employed to designate like parts throughout the same:

Figure 1 is a side elevation of a lure embodying the invention,

Figure 2 is an enlarged plan view of the lure with one-half of its split body portion removed for the purpose of illustration, some parts being shown in section, Figure 3 is a transverse vertical section taken on line 3—3 of Figure 2, Figure 4 is a vertical longitudinal section taken substantially on line 4—4 of Figure 2, and, Figure 5 is a fragmentary horizontal section taken on line 5—5 of Figure 2 the bearing being omitted for the purpose of illustration.

In the drawings, where for the purpose of illustration is shown a preferred embodiment of the invention, the numeral 10 designates generally the body portion of the lure which is preferably formed of light weight molded plastic material, or the like, which may be colored and ornamented to suit the desires of the user and to simulate various types of birds or insects. The body portion 10 is preferably formed in two half sections or portions 11 and 12 which are subsequently cemented or otherwise rigidly secured together in a watertight manner when the lure is assembled. The sections 11 and 12 are joined together in contacting relation along a longitudinal plane 13, extending from end to end of the lure and formed by companion flat faces 14 on the inner meeting sides of the sections 11 and 12. As shown in Figure 1, the assembled lure body portion 10 is elongated and tapers toward its rear end from a point near and rearwardly of its forward end. At its forward end, the body portion 10 has a somewhat reduced extension or head 15 formed thereon and integral therewith to simulate the head of a bird or insect. The lure body portion may be circular in cross section as shown in Figure 3, although it may be formed in other desired cross sectional shapes if preferred. Likewise, the shape of the lure as illustrated in Figure 1 may be modified as found desirable.

The sections or halves 11 and 12 are formed to provide companion cavities or recesses 16 and 17 in their rear portions, and these recesses 16 and 17 form a rear watertight air chamber 18 in the lure for buoyancy when the sections 11 and 12 are joined in assembly. The chamber 18 is elongated, as shown, and extends for approximately one half of the overall length of the lure.

The sections 11 and 12 are further formed in the forward or head portion of the lure with companion recesses 19 and 20 forming a forward watertight air compartment 21 in the forward portion of the lure when the sections 11 and 12 are joined in assembly. The sections 11 and 12 are further provided between the chambers 18 and 21 with companion recesses 22 and 23 which form a central or intermediate compartment 24 in assembly, for the operating mechanism of the lure, to be described hereinafter. The chambers 21, 24 and 18 of the assembled lure are separated by transverse walls or partitions 25 and 26, Figure 4, and the lure body portion further comprises a forward concave wall 27 and a rear end wall 28, as shown.

A tube 29 formed of plastic material, or the like, extends generally longitudinally through the forward watertight compartment 21 and has its forward and rear ends securely anchored within openings 30 and 31 in the walls 27 and 25. The tube 29 forms watertight joints with the walls 27 and 25, so that water cannot enter the compartment 21. Another tube 32 of plastic material or the like extends longitudinally through the compartment 18 and has its opposite ends securely anchored in a watertight manner within openings 33 and 34, formed in the walls 26 and 28.

A transverse shaft 35 extends across the central chamber 24 of the lure at the meeting plane 13 of the two sections 11 and 12 and centrally of the chamber 24. The opposite end portions of the shaft 35 are fixedly held within bearings 36 as shown in Figure 3, recessed into the flat faces 14 of the sections 11 and 12, adjacent opposite sides of the chamber 24.

Rotatably mounted upon the shaft 35 and disposed within the chamber 24 is a spool 37 of plastic material or the like. This spool 37 is provided near its longitudinal center with a relatively large cylindrical winding portion or groove 38. The spool is further provided near one end with another cylindrical winding portion or groove 39 of lesser diameter than the groove 38. The opposite end of the spool 37 has recessed into it and rigidly secured thereto a disc 40, having inclined clutch or ratchet teeth 41 formed thereon and projecting beyond the adjacent end of the spool and beyond the disc 40. The disc 40 is rotatable with the spool 37 upon the stationary shaft 35. A sleeve or bushing 42 is fixedly mounted upon the end portion of the shaft 35 remote from the spool 37, and a relatively large gear 43 having peripheral gear teeth 44 is rotatably and axially slidably mounted upon the sleeve 42, opposite the ratchet disc 40. The gear 43 is provided upon its inner face with inclined clutch or ratchet teeth 45, for coaction with the teeth 41. Leaf spring elements 46 are mounted upon the shaft 35 outwardly of the sleeve 42 and spool 37, and between these elements and the bearings 36. These leaf spring elements 46 bear against the outer faces of the gear 43 and spool 37, as shown, to resiliently urge them toward each other axially so that the ratchet teeth 41 and 45 will normally be held in engagement. Spool 37, like the gear 43 is axially slidable upon the shaft 35. The leaf spring elements 46 are preferably fixed with respect to the shaft 35 so that they will not rotate.

A transverse propulsion shaft 47 of plastic material or the like extends across the chamber 24 rearwardly of the shaft 35 and parallel therewith, at the meeting plane 13. The shaft 47 is journalled in fixed bearings 48 formed in the sections 11 and 12 or formed separately therefrom and recessed into the same. The shaft 47 extends entirely through the body portion 10, transversely thereof and is received within recesses formed in the meeting faces 14. Elements 49 simulating the wings of a small bird or insect are rigidly secured to the end portions of the shaft 47 outwardly of the opposite sides of the body portion 10, and these elements 49 are rotatable with the shaft 47. A small pinion gear 50 is rigidly secured to the shaft 47 within the chamber 24, and this pinion gear has its teeth continually meshing with the teeth 44 of the gear 43, the pinion 50 being considerably wider than the gear 43, as shown in Figure 2. The shaft 47 is immovable endwise or axially, but is freely rotatable.

A section 51 of strong fishing line or the like has one end fixedly secured to the spool 37 within the groove 38 and is windable upon the spool within the groove 38. The line 51 extends from the spool forwardly and through the tube 29, as shown. The forward end of the line 51 has a small ring or eye 52 secured thereto for attaching the same to the main fishing line, or the like. The ring 52 also serves as a stop to prevent the free end of the line 51 from being pulled back through the tube 29. The line 51 is paid off the lower portion of the spool 37 as shown in Figure 4.

An elastic element or band 53 has one end secured to the spool 37 and is windable upon the spool within the groove 39. The band 53 is preferably formed of rubber, synthetic rubber or the like. The elastic band is payed off the bottom of the spool 37 and extends rearwardly thereof and beneath the shaft 47 and through the tube 32. The rear end of the elastic band 53 is attached to an eye 54 formed upon the forward end of a rear screw threaded closure plug 55, having screw threaded engagement with screw threads formed within the rear end of the tube 32. The plug 55 has a rounded head 56 which abuts the rear end wall 28 of the lure body portion 10. A compressible gasket 57 is preferably interposed between the head 56 and the rear end of the body portion 10 to prevent the entrance of water through the screw threads to the chamber 18.

One or more sets of fishhooks 58 are preferably secured at 59 to the section 12 of the body portion 10, as shown.

In use, the eye 52 is secured to the main fishing line of a casting rod. The band 53, due to its elasticity will normally be unwound from the spool 37 and the line 51 will be maintained wound upon the spool, due to the fact that it is wound upon the spool in the opposite direction to the band 53.

The fisherman casts out his line having the lure attached thereto and when the line strikes the water the lure will float due to its buoyancy afforded by the air chambers 21 and 18. When the fisherman desires to cause the lure to propel itself upon the water or "swim," he simply jerks or pulls upon the fishing line with a quick motion, and this causes the line 51 to unwind itself from the spool 37, which causes the spool 37 to rotate clockwise, Figure 4. When this occurs, the elastic band 53 will be simultaneously wound upon the spool 37 and stretched, due to its attachment at 54 to the plug 55. This stretching of the elastic band 53 stores up energy to subsequently cause the unwinding of the elastic band from the spool 37 and the rewinding of the line 51 thereupon.

While the line 51 is being unwound from the spool 37, due to jerking of the line by the fisherman, the inclined ratchet teeth 41 and 45 will override each other and separate due to the resiliency of the springs 46, which yield to permit axial separation of the spool 37 and gear 43. During the separation or overriding of the ratchet teeth 41 and 45, the gear 43 will not turn due to the friction exerted by the adjacent spring 46. In addition, the wings 49 will assume a horizontal position such as that shown in Figure 2 and the reaction thereof with the water in that position is such as to resist any tendency of the gear 43 and the shaft 47 to rotate, thereby complementing the action of the lower spring 46 shown in Figure 2.

After the unwinding of the line 51 due to the action of the fisherman, and when tension on the line is released, the stretched elastic band 53 will automatically unwind from the spool 37 and thereby cause the spool to turn counterclockwise, Figure 4, for rewinding the line 51 thereupon. As this occurs, rotation will be imparted to the gear 43 through the ratchet or clutch teeth 41 and 45, which now cannot override each other due to their direction of inclination and the action of the springs 46 for maintaining them in engagement. As the gear 43 turns counterclockwise, Figure 4, the pinion 50 and shaft 47 carrying the wings 49 will be caused to turn clockwise, Figure 4, and this will propel the lure through the water rearwardly or away from the fisherman. When the elastic band 53 is fully unwound and free from tension, rotation of the shaft 47 and wings 49 will cease, until the fisherman again jerks or tensions the fishing line for causing the above described operation to repeat. Upon each jerk or pull on the line, the forward concave end wall 27 of the lure resists movement of the lure through the water toward the fisherman, and thereby aids in tensioning the stretchable band 53 and winding the same upon the spool 37.

By repeatedly and carefully pulling upon the line, the fisherman can cause the lure to simulate the swimming of a bird or insect, and can actually cause the lure to pull out the fishing line beyond the point that it initially settled upon the water after casting.

In order that access may be had to the interior of the chamber 24 for repairing the working parts or replacing the line 51 or elastic band 53, there is preferably provided in the section 11, adjacent the chamber 24 a removable wall portion 60, secured in place by a screw 61 or the like. As was previously stated, the plug 55 is readily removable in the event that the band 53 needs attention or replacing.

The sections 11 and 12 of the lure body portion 10 are preferably permanently secured together in assembly by a suitable waterproof cement, or by other means, if preferred.

It is to be understood that the form of the invention, herewith shown and described is to be taken as a preferred example of the same and that various changes in the shape, size and arrangement of parts may be resorted to without departing from the spirit of the invention or scope of the subjoined claims.

Having thus described my invention, I claim:

1. A fishing lure comprising a body portion, said body portion having forward and rear air chambers which are watertight and an intermediate chamber, tubes extending through said forward and rear chambers and opening into the intermediate chamber, a shaft journaled upon the body portion for rotation and extending through the intermediate chamber transversely of the lure, propulsion elements carried by said shaft exteriorly of the body portion, a spool rotatably mounted within the intermediate chamber for rotation, overriding clutch and gearing means connecting said spool and shaft within the intermediate chamber, a flexible element wound upon said spool and extending through the tube of the forward air chamber and exteriorly of the body portion, a flexible elastic element wound upon said spool and extending through the tube of the rear air chamber and having an end, and a plug detachably secured to the body portion at a point remote from said spool, said end of the elastic element being secured to the plug.

2. A fishing lure comprising a body portion, rotatable propelling means mounted upon the body portion to effect the travel of the body portion, said propelling means having its rotation opposed by the water when the body portion is traveling through the water, a spool mounted upon the body portion, driving means for said propelling means including a rotatable element, said propelling means including a resilient element connected with the body portion and spool and placed under tension when the spool is rotated in one direction, a flexible element connected with the spool and wound upon the spool when the spool is turned by the resilient element, the flexible element being pulled to rotate the spool in the direction for placing the resilient element under tension, and an automatic one way clutch device connecting the spool and rotatable element, said clutch device serving to lock the spool with the rotatable element for rotation together when the spool is turned by the resilient element and serving to unlock the spool from said rotatable element so that the spool may be turned with relation to the rotatable element when the spool is turned by the pulling action of the flexible element.

3. A fishing lure comprising a body portion, a transverse shaft mounted upon the body portion, paddles mounted upon the transverse shaft and extending for a substantial distance on one side only of the shaft, said paddles having their rotation opposed by the water when the body portion is pulled through the water, a spool mounted upon the body portion, a gear arranged near the spool, a resilient element connected to the body portion and spool and placed under tension when the spool is rotated in one direction, a flexible element connected to the spool and wound upon the spool when the spool is turned by the resilient element, the flexible element being adapted to be pulled to rotate the spool in the direction for placing the resilient element under tension, an automatic one way clutch device connecting the spool and gear, said clutch device serving to lock the spool with the gear for rotation together when the spool is turned by the resilient element and serving to unlock the spool from said gear so that the spool may be turned with respect to said gear when the spool is turned by the pulling action of the flexible element, and a second gear mounted upon said shaft and engaging the first gear.

4. A fishing lure comprising a body portion, rotatable propelling means mounted upon the body portion to effect the travel of the body portion, a spool mounted upon the body portion, driving means for said propelling means including a rotatable element, a resilient element connected with the body portion and spool and placed under tension when the spool is rotated in one direction, said propelling means including a flexible element connected with the spool and wound upon the spool when the spool is turned by the resilient element, the flexible element being pulled to rotate the spool in the direction for placing the resilient element under tension, and an automatic one way clutch device connecting the spool and rotatable element, said clutch device serving to lock the spool with the rotatable element for rotation together when the spool is turned by the resilient element and serving to unlock the spool from said rotatable element so that the spool may be turned with relation to the rotatable element when the spool is turned by the pulling action of the flexible element.

References Cited in the file of this patent

UNITED STATES PATENTS

| | | |
|---|---|---|
| 798,344 | Holz et al. | Aug. 29, 1905 |
| 1,157,166 | Lukstat | Oct. 19, 1915 |
| 2,281,831 | Courvelle | May 5, 1942 |
| 2,430,114 | Helmus | Nov. 4, 1947 |
| 2,704,416 | Laird | Mar. 22, 1955 |

FOREIGN PATENTS

| | | |
|---|---|---|
| 227,103 | Great Britain | Dec. 23, 1924 |